United States Patent [19]

Stock

[11] Patent Number: 4,742,839
[45] Date of Patent: May 10, 1988

[54] SHAKE OR VIBRATION ACTIVATED VALVE OPERATING MECHANISM

[76] Inventor: Robert L. Stock, 746 W. Carlton, Ontario, Calif. 91762

[21] Appl. No.: 899,658

[22] Filed: Aug. 25, 1986

Related U.S. Application Data

[63] Continuation-in-part of Ser. No. 813,857, Dec. 27, 1985, abandoned.

[51] Int. Cl.$^4$ .............................................. F16K 17/36
[52] U.S. Cl. ........................................ 137/38; 251/74
[58] Field of Search ................. 137/38, 39, 45; 251/74

[56] References Cited

U.S. PATENT DOCUMENTS

| | | | |
|---|---|---|---|
| 1,801,816 | 4/1931 | Livingston | 137/38 |
| 3,791,396 | 2/1974 | Nelson | 137/38 |
| 3,890,993 | 6/1975 | MacNeilage | 137/45 |
| 4,161,183 | 7/1979 | Berry | 137/39 |
| 4,546,660 | 10/1985 | Bujold | 137/45 |

FOREIGN PATENT DOCUMENTS

| | | | |
|---|---|---|---|
| 72968 | 6/1980 | Japan | 137/38 |
| 155973 | 12/1980 | Japan | 137/38 |
| 150679 | 11/1981 | Japan | 137/45 |
| 24668 | 2/1983 | Japan | 137/38 |

Primary Examiner—Robert G. Nilson
Attorney, Agent, or Firm—Boniard I. Brown

[57] ABSTRACT

A vibration or shake activated mechanism is provided for operating a valve which has inlet and outlet ports and a valve disk rotatably mounted in a valve body. A spring interconnects the valve body and valve disk to urge the valve disk toward its closed position, and a trigger arm is movably, preferably pivotally, connected with the valve body and has a catch tongue for engaging the valve disk to retain it in its open position. An inertial mass connected with the trigger arm and spaced from the catch tongue effects relative movement between the mass and the valve body to disengage the catch tongue from the valve disk to release it to rotate to its closed position. The mechanism may provide response to vertical shake or vibration, horizontal shake or vibration, or both.

9 Claims, 3 Drawing Sheets

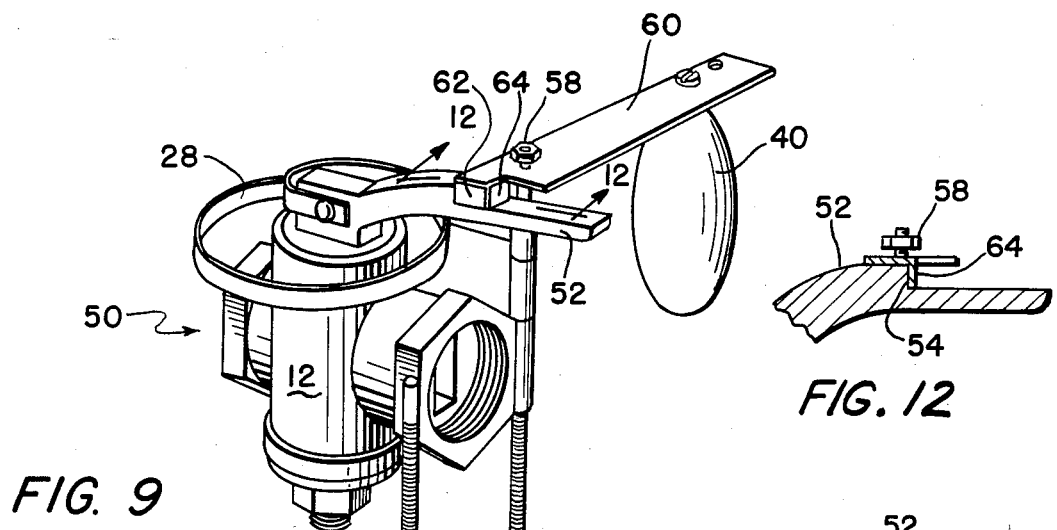
FIG. 9
FIG. 12
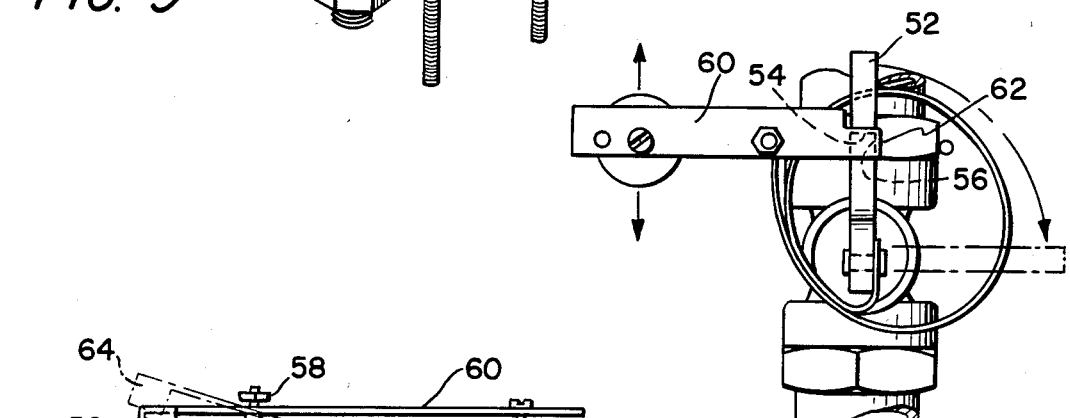
FIG. 10
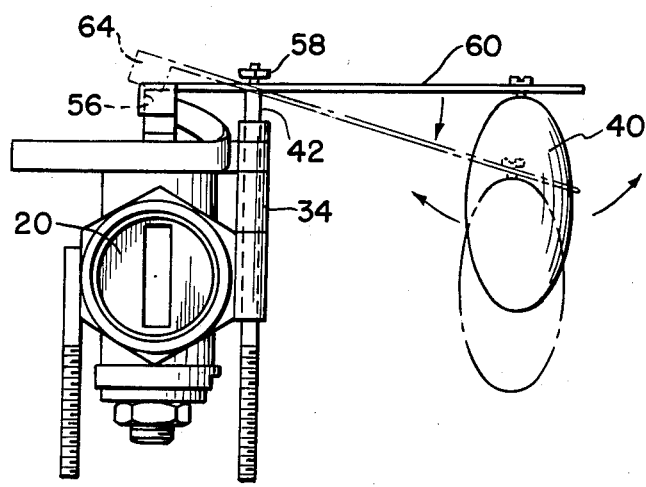
FIG. 11
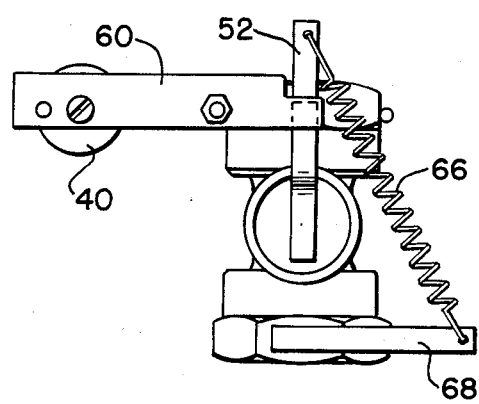
FIG. 13

4,742,839

SHAKE OR VIBRATION ACTIVATED VALVE OPERATING MECHANISM

RELATED APPLICATIONS

This application is a continuation-in-part of application Ser. No. 813,857 filed Dec. 27, 1985, now abandoned.

BACKGROUND OF THE INVENTION

The present invention relates generally to shake or vibration activated mechanisms for operating valves to effect valve closing, and more particularly to such mechanisms which utilize spring means between a valve body and a valve disk or cock, and trigger arm means pivotally mounted on a valve body, with catch means on the trigger arm to retain the valve cock in open position and to disengage from the valve cock to allow the valve cock to rotate to closed position.

There is a great need to provide suitable automatic means, particularly in emergencies, for closing off the valves used to control the flow of gas and water at the main lines outside buildings.

Existing valves are generally operated manually and the valve cock or stem is arranged to be rotated by hand from one position to another or by use of a wrench. In most applications, when a flow valve is used as the main control valve, the valve cock or stem is of the type requiring a wrench to operate. This type of valve, however, has been found to be unsatisfactory during an earthquake. For such an emergency, it is usually recommended that one keep a wrench handy just for the main gas-inlet valve. However, even with a wrench nearby, these valves are not shut off until after an earthquake occurs. Thus, there is a need for a flow-control valve that is activated at the outset of an earthquake by means of the fast and simple operation described herein.

Accordingly, it is an important object of the present invention to provide a vibration-activated, fluid-flow valve that is readily locked in an open mode for continuous flow of fluid, but further includes a vibration-activated, trigger arm which disengages from the valve disk arm, allowing the valve disk arm to be rotated to a closed mode by means of a spring. Thus, the downstream flow line, if ruptured, will not be able to discharge fluid, particularly inside a building.

Another object of the invention is to provide a fluid flow valve of this character that includes a spring interconnected between the valve disk and the valve body, and a trigger arm having a latch tongue at one end and a weight at the opposite end thereof.

A further object of the present invention is to provide a trigger mechanism, whereby the varying amounts of weight at the end of the trigger arm will cause a corresponding varying amount of sensitivity in the trigger arm with respect to its releasing action.

A further object of the invention is to provide a shake or vibration activated valve mechanism for operating a valve which is responsive to either vertical or horizontal shaking or vibration to release a valve disk to rotate to closed position under spring urging.

A still further object of the present invention is to provide a vibration activated valve of this character that is simple and inexpensive to manufacture, it being formed with relatively few operating parts.

It is still another object of the invention to provide a device of this character that is easy to service and maintain.

BRIEF DESCRIPTION OF THE DRAWINGS

FIG. 9 is a perspective view of a third embodiment of the shake activated mechanism of the invention, which is responsive to either vertical or horizontal shaking;

FIG. 10 is a top view of the shake activated mechanism of FIG. 9;

FIG. 11 is a frontal elevational view of the embodiment shown in FIGS. 9 and 10;

FIG. 12 is a fragmentary sectional view taken at line 12—12 in FIG. 9;

FIG. 13 is a top view of another embodiment of the invention, a modified form of the embodiment shown in FIGS. 9-12, wherein a coil spring is utilized.

DETAILED DESCRIPTION OF THE INVENTION

Referring more particularly to FIGS. 1 through 6, there is shown a vibration activated, fluid flow valve, generally indicated at 10. The valve is typically defined by a body 12 formed with oppositely disposed ports 14. Depending on the position of the valve within a flow line, indicated by pipes 16, one port will become an outlet and the other an inlet.

Figure 1:
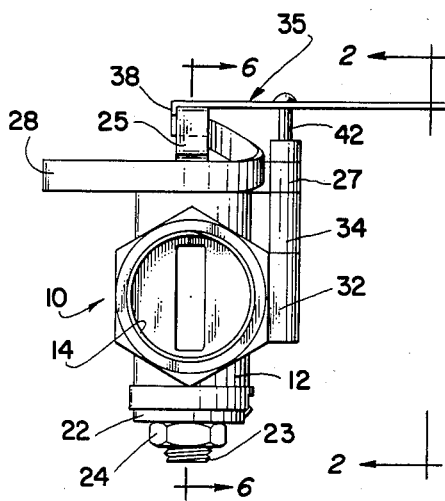
FIG. 1 is a front elevational view of the shake activated, fluid control valve showing a trigger arm being latched to a valve arm to secure the valve arm in an open position to allow flow of fluid therethrough.
Figure 2:
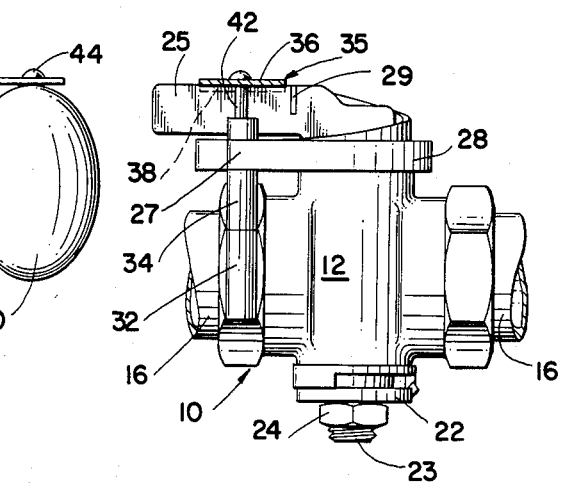
FIG. 2 is a cross-sectional view taken along line 2—2 of FIG. 1, the valve body being shown in full and having pipes mounted in a typical manner to the front and rear inlets.
Figure 4:
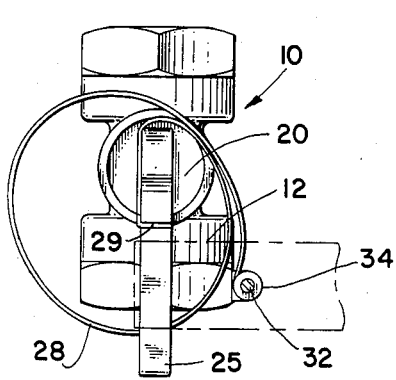
FIG. 4 is a top plan view of the valve with the trigger arm removed to illustrate the position of the spring with respect to the open position of the valve disk and its arm.
Figure 3:
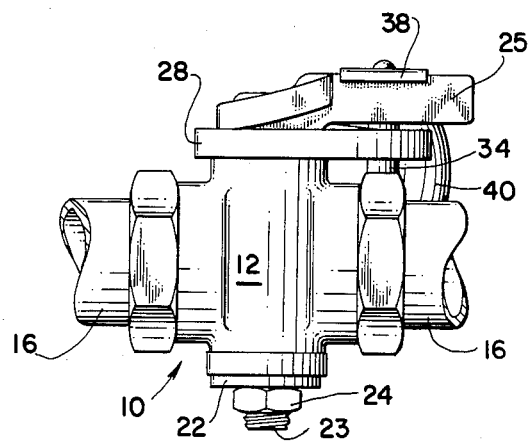
FIG. 3 is a left side elevational view thereof.
Figure 5:
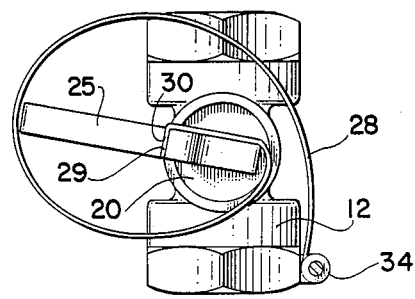
FIG. 5 is a top plan view similar to that of FIG. 4, but with the valve disk rotated to a closed position.
Figure 6:
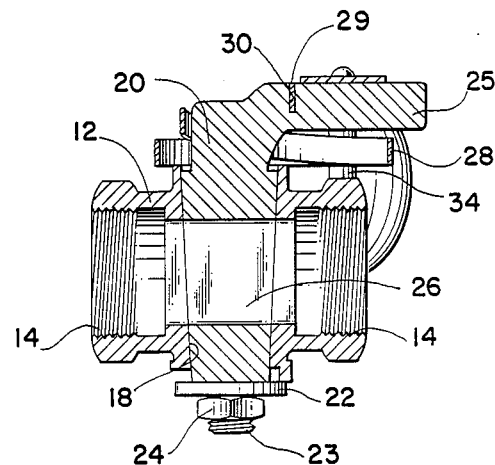
FIG. 6 is a cross-sectional view taken substantially along line 6—6 of FIG. 1.

Valve body 10 further includes a transverse bore 18 in which valve disk 20, typically and in this embodiment a valve cock, is rotatably mounted by means of washer 22, threaded stud 23 and nut 24, the nut depending from valve cock 20. As used herein, the term "disk" is used generically to encompass ball valve elements, valve cocks and other movable valve members. The valve cock also includes a valve arm 25 which is formed in the same plane as the elongated flow passage 26. That is, when valve arm 25 is positioned longitudinally along the longitudinal axis of ports 14, the passage 26 will also be aligned with said ports to establish an open valve mode, as seen in FIG. 6. When valve arm 25 is rotated substantially at 90° (seen in FIG. 5), passage 26 is positioned 90° with respect to ports 14, thus placing the valve in a closed mode.

Accordingly, the present invention includes a biasing means which is defined by a curved or coiled flat spring 28 that is interconnected between valve arm 25 and valve body 12. One end of spring 28 is bent to define a lip member 29 which is mounted to valve arm 25 by means of slot 30. The opposite coiled end 26 of spring 28 is formed so as to be secured to valve body 12 by boss member 32 which is integrally formed as part of the valve body 12. Attached to boss member 32 is a mounting post 34 to which the coiled end 27 of spring 28 is secured. Thus, as the valve cock is rotated counter-clockwise to an open position, spring 28 will coil tighter to provide a clockwise rotational force.

In order to place valve 10 in an open mode, valve arm 25 is rotated counter-clockwise approximately 90°, as described above, and latched into a fixed position by a latching means, generally designated at 35, which comprises a trigger-arm member 36 having one end formed with a catch tongue or latch tongue 38 and the opposite end thereof adapted to support a mass 40 (weight). Trigger arm 36 is pivotally supported in a generally horizontal position by a pin 42 which extends through an opening in the arm and is loosely retained to allow vertical pivotal movement of the arm. The arm 36 is loosely retained by engagement of its wall opening about a reduced portion of pin 42 when the latch is not engaged, the opening in arm 36 being smaller than the enlarged portion of the pin 42. When the latch is engaged, arm 36 is ordinarily maintained spaced from the shoulder defined between the reduced and enlarged portions of the pin, and the wall of the opening in arm 36 is urged against the pin by the spring force transmitted by arm 25 and latch 36, thus to urge the bar into engagement with the pin to maintain the pin in an upward position relative to the pin shoulder. The arrangement is further indicated in FIGS. 7, 8, 9, 11 and 13.

The mass 40 is attached to the free end of the trigger arm 36 by a pin or screw 44. When latch tongue 38 is hooked behind valve arm 25, the valve arm will forceably engage the latch tongue, thus overcoming the weight of mass member 40. Hence, predetermined vertical relative movement of mass 40 will cause latch tongue 38 to disengage valve arm 25, thus allowing the arm to rotate to a closed position by means of spring 28. The sensitivity of latch arm 36 can be adjusted by the weight of mass 40. Thus, the design and arrangement of the valve structure shown in FIGS. 1 through 6 require that this embodiment is to be employed in a horizontal position.

Figure 7:
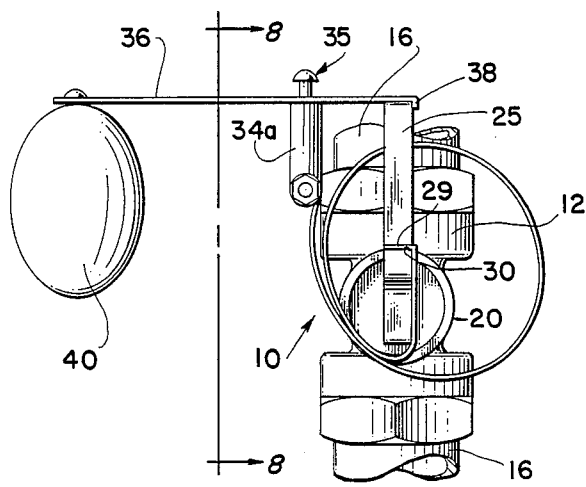
FIG. 7 is a top plan view of an alternative embodiment of the invention wherein the valve is adapted to be mounted in a vertical position, and wherein the trigger arm remains in a horizontal position.
Figure 8:
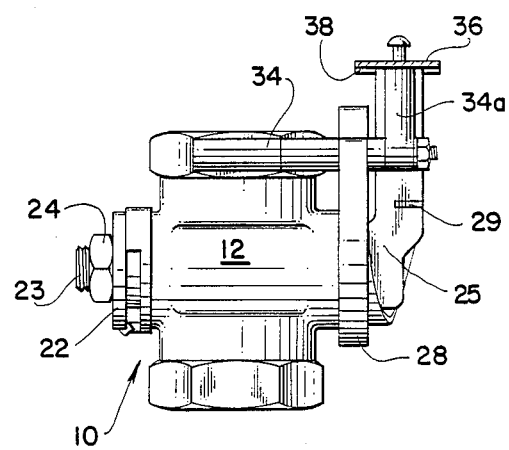
FIG. 8 is a cross-sectional view taken along line 8—8 of FIG. 7.

However, it should be noted that in the second embodiment of the invention, as illustrated in FIGS. 7 and 8, body 12 must be mounted in a vertical position whereas the latching means is still positioned in a horizontal position. Accordingly, FIG. 7 shows valve 10 and pipes 16 in a vertical position with spring 28 mounted on the side and connected to valve arm 25, as heretofore described. In this arrangement, when the valve arm 25 is in an open mode it must be placed in an upright position, whereby trigger arm 36 is horizontally arranged by means of a second mounting post 34a. With this arrangement, latch tongue 38 hooks over the tip end of arm 25. Again, the clockwise rotational force placed on the valve arm 25 causes the engagement of latch tongue 38 so as to secure the trigger arm 36 in a horizontal position until valve 10 and mass 40 are subjected to shaking or vibration, such as that generated by an earthquake. When released, arm 25 will rotate approximately 90° to a horizontal position, thus closing the valve.

FIGS. 9 to 13 illustrate other embodiments of the invention which differ from the embodiments of FIGS. 1 to 8 in utilizing a valve disk arm or valve cock arm 52 whereon is defined a corner which has mutually perpendicular vertical surfaces 54, 56, and a trigger arm having two catch tongue portions which are disposed at right angles to each other, catch tongue portion 62 extending longitudinally of arm 52 and catch tongue portion 64 extending generally transversely of the arm, as best shown in FIGS. 9 10 and 12. The trigger arm is pivotally mounted on a reduced portion of pin 42 for horizontal and vertical pivotal movement and is loosely retained thereon by a nut 58.

Upon the occurrence of an appropriate shake or vibration above a predetermined level, in a vertical direction, the trigger arm 60 is pivoted in the manner generally indicated in FIG. 11, thus to disengage catch tongue portion 62 of the arm from surface 56 of the corner defined on valve cock arm 52, thus to release the valve cock for rotation under the axis of the spring 28 to rotate the valve cock to its closed position and close the valve.

Upon the occurrence of a shake or vibration in a horizontal direction above a predetermined level, trigger arm 60 is pivoted horizontally about pivot pin 42, thus disengaging catch tongue portion 64 from the surface 54 of the corner defined on valve cock arm 52, thereby releasing the arm 52 for rotation under the urging of spring 28 to place the valve cock in its closed position to shut off flow through the valve.

The pivotal movement of trigger arm 60, in either the horizontal or vertical direction, is effected by the inertial mass 40 causing relative movement between the mass and the valve body upon occurrence of the shake or vibration.

This embodiment of the invention thereby provides for operation of the mechanism of the invention to close the valve cock, whether shake causes relative movement between the mass 40 and the valve body in a horizontal direction, or in a generally vertical direction.

FIG. 13 illustrates a modified form of the embodiment of the invention shown in FIGS. 9 to 13, wherein a coil-type spring 66 is utilized and is attached to the outer end of valve cock arm 52, and to a bar 68 which is secured, as by welding, to the valve body, by engagement of bent end portions of the spring in openings in bar 68 and in the outer end portion of arm 52.

There has been shown and described a novel shake activated valve mechanism which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A vibration or shake activated mechanism for operating a valve having a body with inlet and outlet ports and a valve disk rotatably mounted in the valve body for movement between open and closed position, the mechanism comprising:

spring means connected between the valve body and the valve disk to exert biasing force to rotatably urge the valve disk toward its said closed position, trigger arm means pivotally mounted at a pivot point for pivotal movement relative to the valve body, catch means comprising a catch tongue on an inner end portion of the trigger arm means and spaced from said pivot point for engagement with the valve disk to retain the valve disk in its said open position against the urging of said spring, the trigger arm means and the pivot point providing for vertical and horizontal pivoting of the trigger arm means, the valve disk having an arm portion defining a corner having mutually perpendicular generally vertical surfaces, the catch tongue comprising two portions at right angles to each other, one extending generally transversely of the trigger arm means and the other extending longitudinally of the arm, and an inertial mass mounted on an end portion of the trigger arm means opposite from the catch tongue and spaced from the pivot means in the direction opposite from the catch tongue, the mass providing inertial resistance to such shake or vibration for relative movement between the mass means and the valve body to disengage the catch means from the valve disk to release the valve disk to rotate to its closed position under the urging of said spring.

2. A valve operating mechanism according to claim 1, wherein:

the valve disk arm is arranged to extend longtidunally of the valve body when the valve disk is in its open position and to extend transversely of the valve body when the valve disk is in its closed position.

3. A valve operating mechanism according to claim 1, wherein:

an inner end portion of the spring is attached to the valve disk arm and the outer end of the spring is connected with the valve body to exert biasing force on the valve disk to urge the valve disk to its open position.

4. A valve operating mechanism according to claim 1, and further including:

post means on the valve body and carrying the pivot point for pivotal mounting of the trigger arm means.

5. A valve operating mechanism according to claim 1, wherein:

the valve disk arm is arranged to extend longitudinally of the valve body when the valve disk is in its open position and to extend transversely of the valve body when the valve is in its closed position.

6. A valve operating mechanism according to claim 1, wherein:

an inner end portion of the spring is attached to the valve disk arm and the outer end of the spring is connected with the valve body to exert biasing force on the valve disk to urge the valve disk to its open position.

7. A valve operating mechanism according to claim 1, wherein:

said spring is a generally flat curved spring.

8. A valve operating mechanism according to claim 1, wherein:

the spring is an helical spring.

9. A vibration or shake activated mechanism for operating a valve having a body with inlet and outlet ports and a valve disk having an arm and being rotatably mounted in the valve body for movement between open and closed positions, the mechanism comprising:

spring means connected between the valve body and the valve disk to exert biasing force to rotatably urge the valve disk toward its said closed position, trigger arm means pivotally mounted at a pivot point for pivotal movement relative to the valve body, the trigger arm means and the pivot point cooperating for pivotal movement of the trigger arm means in a vertical direction, catch means comprising a catch tongue on an inner end portion of the trigger arm means and spaced from said pivot point for engagement with the valve disk to retain the valve disk in its said open position against the urging of said spring, the valve disk having an arm portion which defines a generally vertical surface oriented generally transversely of the valve disk arm, and an inertial mass mounted on an end portion of the trigger arm means opposite from the catch tongue and spaced from the pivot means in the direction opposite from the catch tongue, the mass providing inertial resistance to such shake or vibration for relative movement between the mass means and the valve body to disengage the catch means from the valve disk to release the valve disk to rotate to its closed position under the urging of said spring.

* * * * *